United States Patent
Seki et al.

(10) Patent No.: US 11,296,790 B2
(45) Date of Patent: Apr. 5, 2022

(54) TRANSMISSION SYSTEM AND WAVELENGTH RESOURCE MANAGEMENT METHOD

(71) Applicant: Nippon Telegraph and Telephone Corporation, Tokyo (JP)

(72) Inventors: Toshihiko Seki, Tokyo (JP); Osamu Okino, Tokyo (JP); Hiroyuki Oyanagi, Tokyo (JP); Yuichiro Ishizuka, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/051,850

(22) PCT Filed: May 8, 2019

(86) PCT No.: PCT/JP2019/018390
§ 371 (c)(1),
(2) Date: Oct. 30, 2020

(87) PCT Pub. No.: WO2019/220980
PCT Pub. Date: Nov. 21, 2019

(65) Prior Publication Data
US 2021/0328673 A1 Oct. 21, 2021

(30) Foreign Application Priority Data
May 17, 2018 (JP) .............................. JP2018-095235

(51) Int. Cl.
*H04J 14/02* (2006.01)
*H04B 10/27* (2013.01)
*G02B 6/293* (2006.01)

(52) U.S. Cl.
CPC ........... *H04B 10/27* (2013.01); *G02B 6/2938* (2013.01); *H04J 14/0227* (2013.01); *H04J 14/0278* (2013.01)

(58) Field of Classification Search
CPC ................... H04B 10/27; H04J 14/0278; H04J 14/0227; H04J 14/0271; G02B 6/2938
See application file for complete search history.

(56) References Cited

U.S. PATENT DOCUMENTS

| 2010/0215377 A1* | 8/2010 | Tajima | H04B 10/2513 |
| | | | 398/147 |
| 2018/0123724 A1* | 5/2018 | Zhang | H04J 14/0271 |

(Continued)

OTHER PUBLICATIONS

Fujitsu.com, [online], "Fujitsu Network Flashwave 7500 S Specifications," 2018, retrieved on Apr. 5, 2018, retrieved from URL<http://www.fujitsu.com/jp/products/network/carrier-router/photonicnetwork/wdm-adm/wdm/flashwave7500s/spec/index.html>, 6 pages (with English Translation).

(Continued)

*Primary Examiner* — Dzung D Tran
(74) *Attorney, Agent, or Firm* — Fish & Richardson P.C.

(57) ABSTRACT

A transmission system formed by connecting sites through an optical fiber stores at least unique information of the transmission functional devices for each site, connection information, and information of wavelength resources that can be accommodated in the optical fiber in a facility DB as DB information D2. When the number of wavelengths of order information for requesting the number of wavelengths required for transmission of optical signals between sites is larger than the number of wavelengths that can be accommodated in the optical fiber of the DB information D2, the number of wavelengths for each of the transmission functional devices required for enabling the number of wavelengths of the order information D1 to be accommodated in (Continued)

the optical fiber is designed using the design unit. Designed numbers of wavelengths are configured in the corresponding transmission functional devices using the configuration unit.

3 Claims, 9 Drawing Sheets

(56) References Cited

U.S. PATENT DOCUMENTS

2019/0037288 A1* 1/2019 Fujisawa ............ H04B 10/0793
2019/0207701 A1* 7/2019 Ferreira Pedro .... H04J 14/0257

OTHER PUBLICATIONS

Oki.com, [online], "Ciena 6500 Family," 2018, retrieved on Apr. 5, 2018, retrieved from URL<https://www.oki.com/jp/optical/product/ciena/6500.html>, 5 pages (with English Translation).
Pr.fujitsu.com, [online], "Optical Transmission Systems "1 FINITY" and Substantially Expanding the Lineup of the Series," Mar. 23, 2016, retrieved on Apr. 5, 2018, retrieved from URL<http://pr.fujitsu.com/jp/news/2016/03/23.html#footnote6>, 10 pages (with English Translation).
Tech.nikkeibp.co.jp, [online], "Quick-Learning Course—Optical Networks Becoming Familiar (15)," Jun. 15, 2006, retrieved on Apr. 5, 2018, retrieved from URL<http://tech.nikkeibp.co.jp/it/article/COLUMN/20060607/240199/?rt=nocnt>, 9 pages (with English Translation).

* cited by examiner

TRANSMISSION SYSTEM AND WAVELENGTH RESOURCE MANAGEMENT METHOD

CROSS-REFERENCE TO RELATED APPLICATIONS

This application is a National Stage application under 35 U.S.C. § 371 of International Application No. PCT/JP2019/018390, having an International Filing Date of May 8, 2019, which claims priority to Japanese Application Serial No. 2018-095235, filed on May 17, 2018. The disclosure of the prior application is considered part of the disclosure of this application, and is incorporated in its entirety into this application.

TECHNICAL FIELD

The present invention relates to a transmission system of a disaggregation type formed by connecting sites including various transmission functional devices having functions required for data transmission of various vendor specifications using optical fibers and a wavelength resource management method.

BACKGROUND ART

Figure 8:
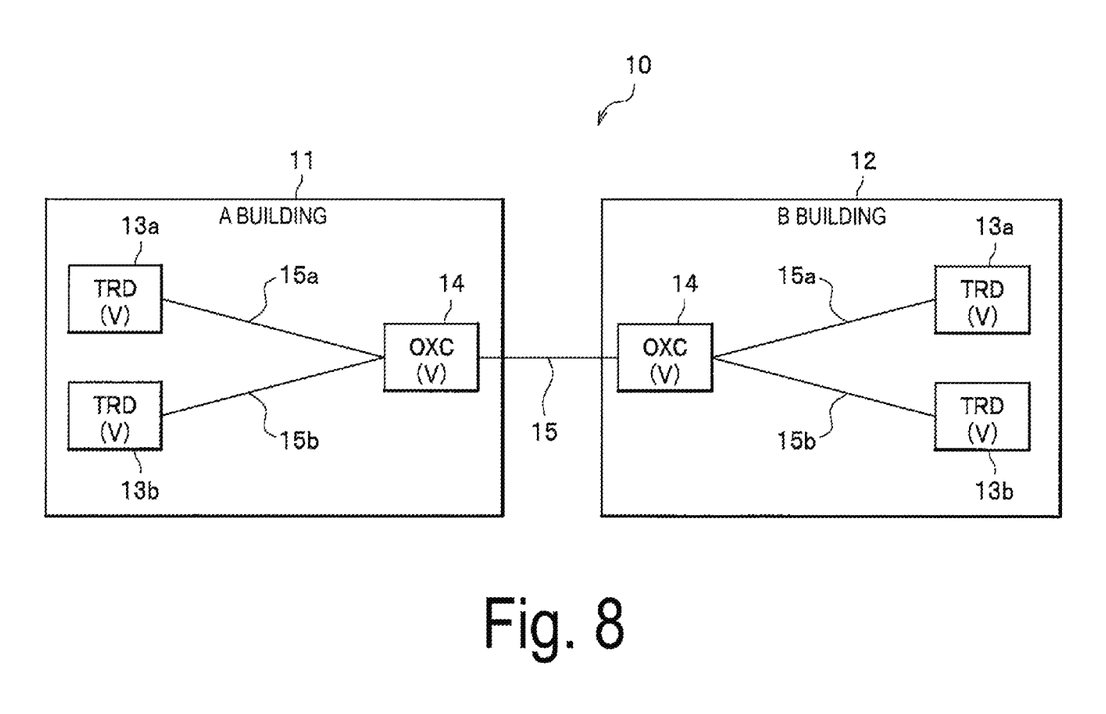
FIG. 8 is a block diagram illustrating a configuration of a transmission system of an all-in-one type of the related art.

When communication is performed between sites, a transmission system 10 of an all-in-one type illustrated in FIG. 8 is mainly applied at present. In this transmission system 10, a plurality of transponders (TRD) 13a and 13b and an optical cross-connect (OXC) 14 are disposed in each of an A building 11 and a B building 12 that are two sites, and the OXCs 14 of the A building 11 and the B building 12 are connected through an optical fiber 15. In addition, the transmission system 10 is configured such that the TRDs 13a and 13b and the OXCs 14 of the A building 11 and the B building 12 are connected through optical fibers 15a and 15b.

In the transmission system 10 of the all-in-one type, all the TRDs 13a and 13b and the OXCs 14 of the A building 11 and the B building 12 have specifications of the same vendor V.

The OXC 14 is a device that can freely configure an optical communication line for data transmission in the optical fiber 15 through switching. In this OXC 14, even in a case where there are data transmission paths of which formats are different for each use or each transmission speed of communication, data signals can be output to different paths.

The TRDs 13a and 13h are relay devices that are connected to communication devices such as a personal computer (PC), a router, a switch, and the like of a user not illustrated in the drawings, and desired communication devices can communicate with each other between the A building 11 and the B building 12 through the TRDs 13a and 13b.

In recent years, over the top (OTT) has been a service that provides multimedia such as video streaming, voice calling, and social networking services (SNS) via the Internet. The opening of transmission systems has progressed under the lead of this OTT. For this reason, in place of the conventional transmission system of the all-in-one type, a transmission system of a disaggregation type described below has received attention.

The transmission system of the disaggregation type is configured to provide communication services in a flexible and speedy manner by separating and combining various functions such as a transport function, a wavelength division multiplexing (WDM) function, a switch function, and an access function that are constituent elements of the all-in-one type.

Figure 9:
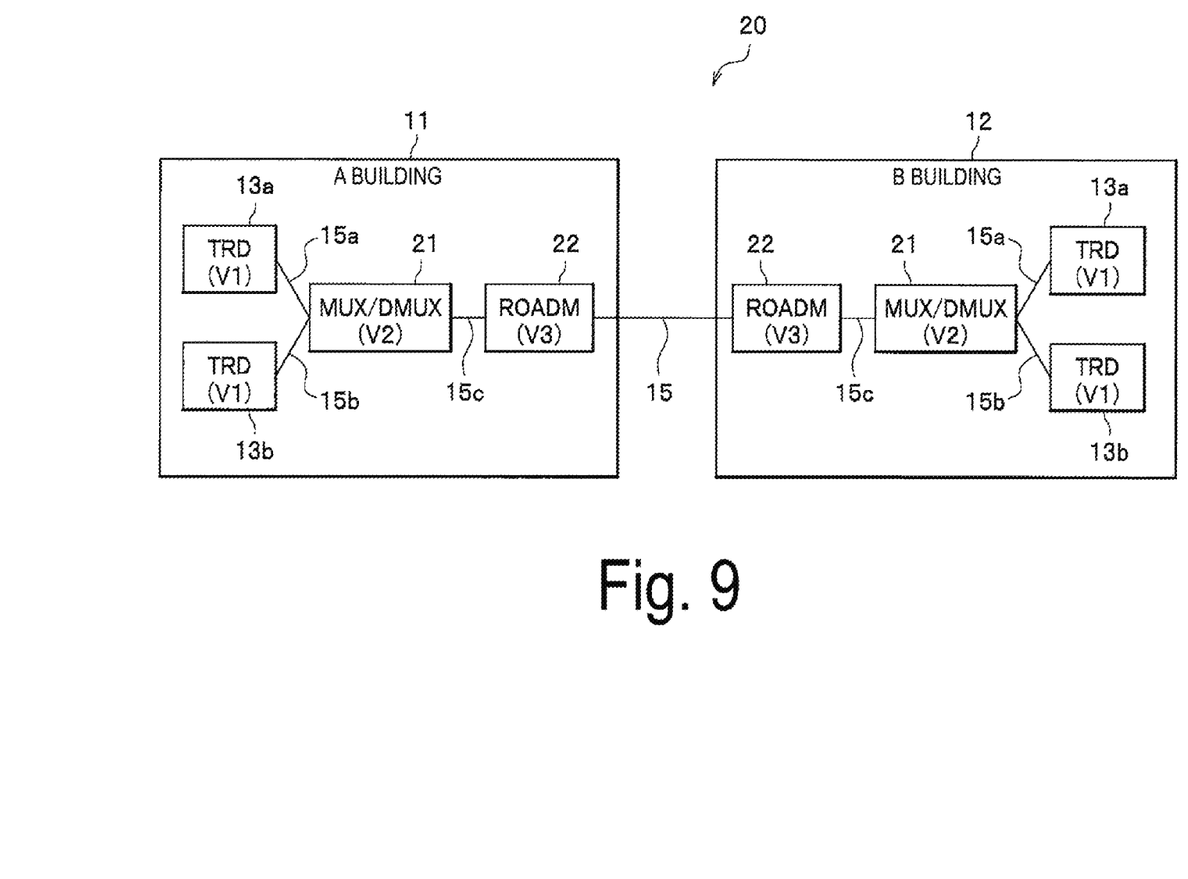
FIG. 9 is a block diagram illustrating a configuration of a transmission system of a disaggregation type of the related art.

FIG. 9 illustrates one configuration example of a transmission system 20 of a disaggregation type. In the transmission system 20, a plurality of TRDs 13a and 13b, a multiplexer (MUX)/DeMUX (DMUX) 21, and a reconfigurable optical add/drop multiplexer (ROADM) 22 are disposed in each of an A building 11 and a B building 12, and the ROADMs 22 of the A building 11 and the B building 12 are connected through an optical fiber 15. In addition, in the A building 11 and the B building 12, the TRDs 13a and 13b and the MUX/DMUXs 21 are respectively connected through optical fibers 15a and 15b, and the MUX/DMUX 21 and the ROADM 22 are connected through an optical fiber 15c. Both the MUX/DMUX 21 and the ROADM 22 have functions corresponding to the OXC 14.

In the transmission system 20 of the disaggregation type, the TRD 13a, the MUX/DMUX 21, and the ROADM 22 have specifications of different vendors such that the TRD 13a has specifications of vendor V1, the MUX/DMUX 21 has specifications of vendor V2, and the ROADM 22 has specifications of vendor V3.

In the MUX/DMUX 21, the MUX multiplexes a plurality of signals into one signal and outputs the signal, and the DMUX splits one signal into a plurality of signals and outputs the plurality of signals. The ROADM 22 performs a multiplexing process by adding or dropping an optical signal with the optical signal maintained as light. This ROADM 22 has a function that is substantially equivalent to a wavelength division multiplexing (WDM) function that simultaneously transmits optical signals having a plurality of different wavelengths over one optical fiber.

As one example of the transmission system of the disaggregation type, there is a transmission system described in Non Patent Literature 1. In Non Patent Literature 2, an example of details of an operating status of the disaggregation type is described. An example of the transmission system 10 of the all-in-one type is described in Non Patent Literature 3. In addition, an example of wavelength resources of 32 wavelengths of an optical fiber connecting two sites in a transmission system of the all-in-one type or the disaggregation type is described in Non Patent Literature 4.

CITATION LIST

Non Patent Literature

Non Patent Literature 1: "Expansion of Line-up of Optical Transmission System 'IFINITY' series". [online], Fujitsu Corporation, Mar. 23, 2016. [retrieved on Apr. 24, 2018], Internet <(http://pr.fujitsu.com/jp/news/2016/03/23.html#footnote6>

Non Patent Literature 2: Hagimoto Kazuo and two others, "Quick Understanding Lecture Optical Network Corning Close (15)", [online], Nikkei Communication, Jun. 15, 2006 [retrieved on Apr. 24, 2018], Internet <http://tech.nikkeibp.co.jp/it/article/COLUMN/20060607/240199/?rt=nocnt>rt=nocnt>

Non Patent Literature 3: "FUJITSU Network FLASH-WAVE 7500S Specifications". [online], Fujitsu Corporation, [retrieved on Apr. 24, 2018], Internet: <http://www.fujitsu-com/jp/products/network/carrier-router/photonicnetwork/wdm-adm/wdm/flashwave7500s/spec/index.html>

Non Patent Literature 4: "Ciena 6500 Family", [online], Oki Electric Industry Co., Ltd. [retrieved on Apr. 24, 2018], Internet <https://www.oki.com/jp/optical/product/ciena/6500.html>

SUMMARY OF THE INVENTION

Technical Problem

In the transmission system 10 of the all-in-one type illustrated in FIG. 8 described above, all of the TRDs 13a and 13b and the OXC 14 have specifications of the same vendor, and thus, wavelength resources (for example, 10 wavelengths) that can be accommodated in the optical fiber 15 connecting the OXCs 14 of the A building 11 and the B building 12 can be easily grasped. In this case, the wavelength resources are, for example, fixed to 10 wavelengths, and thus, the wavelength resources can be easily managed.

However, in the transmission system 20 of the disaggregation type illustrated in the TRDs 13a and 13b, the MUX/DMUX 21, and the ROADM 22 have specifications of different vendors. For this reason, it becomes difficult to grasp wavelength resources that can be accommodated in the optical fiber 15 connecting the ROADMs 22 of the A building 11 and the B building 12, and there is a problem in that the wavelength resources cannot be easily managed.

The present invention is made in view of such situations, and an object thereof is to provide, in a transmission system of a disaggregation type formed by connecting, through an optical fiber, sites having various transmission functional devices having specifications of different vendors, a transmission system capable of easily perceiving and managing wavelength resources that can be accommodated in the optical fiber and a wavelength resource management method.

Means for Solving the Problem

As a means for solving the above-described problems, an invention according to a first aspect is a transmission system of a disaggregation type formed by connecting, through an optical fiber, sites each including various transmission functional devices having specifications of different vendors, the transmission system including: a database (DB) configured to store, as DB information, facility information including at least unique information of each of the transmission functional devices, connection information between the transmission functional devices, and information of the number of wavelengths as wavelength resources that can be accommodated in the optical fiber between the sites, the wavelength resources being determined based on the numbers of wavelengths of the transmission functional devices; a design unit configured to design the number of wavelengths of each of the transmission functional devices required for enabling the number of wavelengths of order information for requesting the number of wavelengths required when optical signals are transmitted through the optical fiber between the sites to be accommodated in the optical fiber based on the facility information of each of the transmission functional devices stored to include the DB information in the DB in a case where the number of wavelengths of the order information is larger than the number of wavelengths that can be accommodated in the optical fiber included in the DB information; and a configuration unit configured to configure the designed numbers of wavelengths in the corresponding transmission functional devices.

An invention according to a third aspect is a wavelength resource management method using a transmission system of a disaggregation type formed by connecting, through an optical fiber, sites each including various transmission functional devices having specifications of different vendors, the transmission system including a DB configured to store, as DB information, facility information including at least unique information of each of the transmission functional devices, connection information between the transmission functional devices, and information of the number of wavelengths as wavelength resources that can be accommodated in the optical fiber between the sites, the wavelength resources being determined based on the numbers of wavelengths of the transmission functional devices, a design unit, and a configuration unit, the wavelength resource management method including: designing, by the design unit, the number of wavelengths of each of the transmission functional devices required for enabling the number of wavelengths of order information for requesting the number of wavelengths required when optical signals are transmitted through the optical fiber between the sites to be accommodated in the optical fiber based on the facility information of each of the transmission functional devices stored to include the DB information in the DB in a case where the number of wavelengths of the order information is larger than the number of wavelengths that can be accommodated in the optical fiber included in the DB information; and configuring, by the configuration unit, the designed numbers of wavelengths in the corresponding transmission functional devices.

According to the configuration of the first aspect and the method of the third aspect, the wavelength resources required for the transmission of the optical signals between the sites through the optical fiber requested by the order information can be automatically configured in the transmission functional devices of each site. For this reason, in the transmission system of the disaggregation type, the wavelength resources that can be accommodated in the optical fiber can be easily grasped and managed.

An invention according to a second aspect is the transmission system according to the first aspect, in which the design unit includes an accommodability determining unit configured to determine whether the number of wavelengths of each of the transmission functional devices according to the design exceeds the number of wavelengths that can be accommodated in the optical fiber in a case where all the transmission functional devices stored in the DB are used, and display a necessity to install additional transmission functional devices in a display unit in a case where the number of wavelengths of each of the transmission functional devices according to the design exceeds the number of wavelengths that can be accommodated in the optical fiber.

According to this configuration, when the number of wavelengths of each transmission functional device according to the design exceeds the number of wavelengths that can be accommodated in the transmission functional devices based on the DB information, a necessity to install additional transmission functional devices can be displayed in the display unit. For this reason, the system administrator can see the displayed information and install additional transmission functional devices.

Effects of the Invention

According to the present invention, in a transmission system of a disaggregation type formed by connecting, through an optical fiber, sites having various transmission functional devices having specifications of different vendors, a transmission system and a wavelength resource management method capable of easily grasping and managing wavelength resources that can be accommodated in the optical liber can be provided.

DESCRIPTION OF EMBODIMENTS

Embodiments of the present invention will be described below with reference to the drawings.

Configuration of Embodiment

Figure 1:
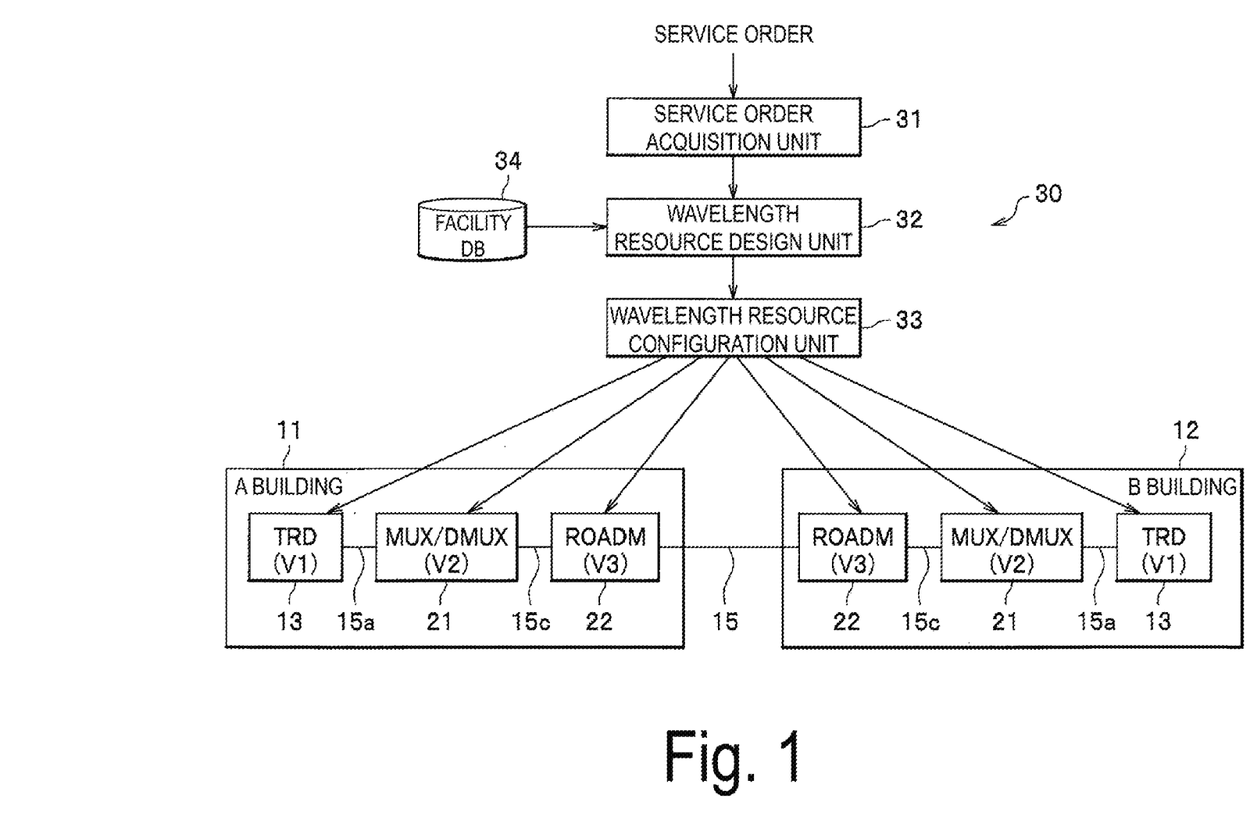
FIG. 1 is a block diagram illustrating a configuration of a transmission system of a disaggregation type according to an embodiment of the present disclosure.

FIG. 1 is a block diagram illustrating configuration of a transmission system of a disaggregation type according to an embodiment of the present invention. In the transmission system 30 illustrated in FIG. 1, the same reference signs will be assigned to parts corresponding to those of the transmission system 20 of the related art illustrated in FIG. 9, and a description thereof will be omitted as appropriate.

The transmission system 30 of the disaggregation type illustrated in FIG. 1 includes a TRD 13, a MUX/DMUX 21, and a ROADM 22 as various transmission functional devices having functions required for data transmission (data transmission/reception) disposed in each of an A building 11 and a B building 12 that are sites of communication. In addition, the transmission system 30 is configured to include a service order acquisition unit (also referred to as an acquisition unit) 31, a wavelength resource design unit (also referred to as a design unit) 32, a wavelength resource configuration unit (also referred to as a configuration unit) 33, and a facility database (DB) 34, which are featured elements of this embodiment. The TRD 13, the MUX/DMUX 21, and the ROADM 22 have specifications of different vendors such that the TRD 13 has specifications of a vendor V1, the MUX/DMUX 21 has specifications of a vendor V2, and the ROADM 22 has specifications of a vendor V3. Here, the acquisition unit 31, the design unit 32, the configuration unit 33, and the facility DB 34 may be configured as individual devices, or all of them may be configured as one device. The facility DB 34 configures a DB according to the claims.

The acquisition unit 31 is configured based on business support systems (BSS) supporting a business aspect such as user management. This acquisition unit 31 receives and acquires a service order (described below) from a user. The service order is, for example, an application request for a transmission line configuration for using one optical signal having a wavelength of 10 GHz in a section between the ROADM 22 of the A building 11 and the ROADM 22 of the B building 12 (also referred to as a section A-B or between sites).

The design unit 32 is configured based on operation support systems (OSS) that support network operations. In a case where the number of required wavelengths requested as order information when an optical signal is transmitted through an optical fiber 15 in the section A-B is larger than the number of wavelengths that can be accommodated in the optical fiber 15 included in DB information D2, which will be described below, sign unit 32 designs the number of wavelengths of the TRD 13, the MUX/DMUX 21, and the ROADM 22 that is required to obtain the number of wavelengths that allows the number of wavelengths of the order information to be accommodated in the optical fiber 15.

Figure 2:
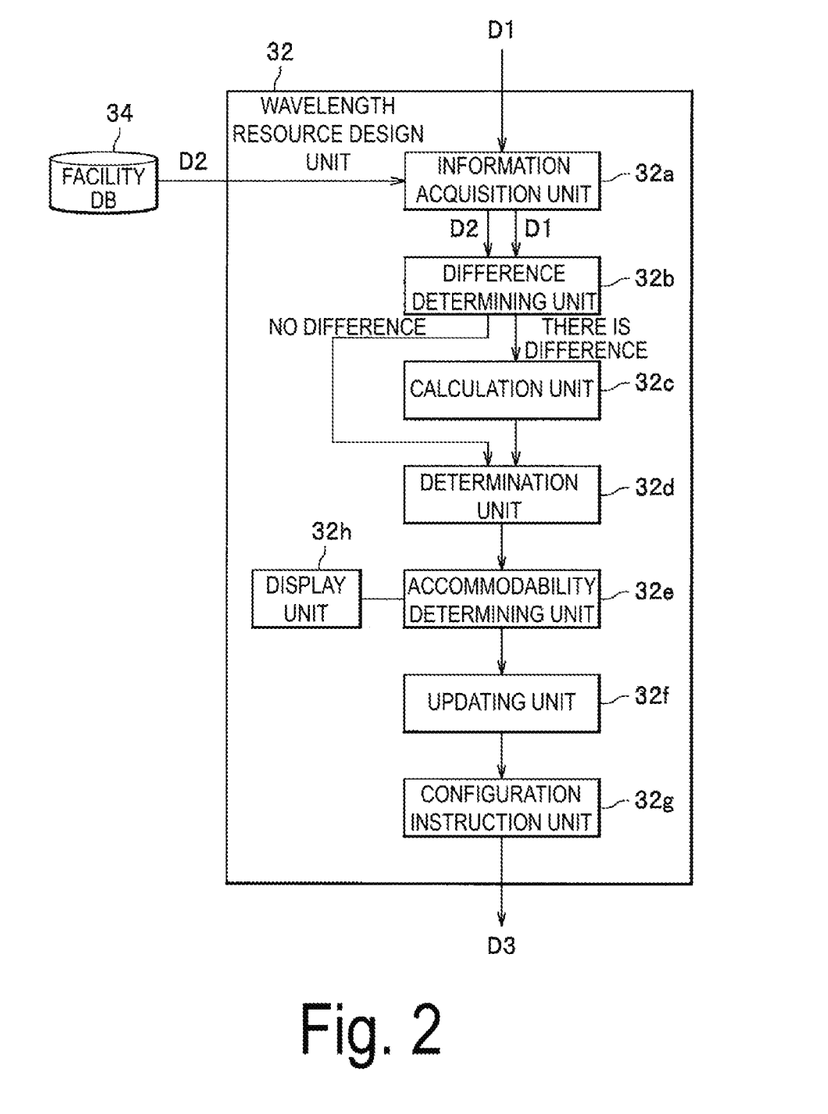
FIG. 2 is a block diagram illustrating a configuration of a wavelength resource design unit in the transmission system of the disaggregation type according to this embodiment.

As illustrated in FIG. 2, the design unit 32 includes an information acquisition unit 32a, a difference determining unit 32b, a calculation unit 32c, a determination unit 32d, an accommodability determining unit 32e, an update unit 32f, a configuration instruction unit 32g, and a display unit 32h.

The information acquisition unit 32a acquires service order information (also referred to as order information) D1 received and acquired by the acquisition unit 31 (FIG. 1) and the DB information D2 stored in the facility DB 34 described below. The DB information D2 includes building unique information such as the names of the A building 11 and the B building 12 in the transmission system 30, floor information, and facility information such as unique information of the transmission functional devices such as the TRD 13, the MUX/DMUX 21, and the ROADM 22, information of ports (described below) of each transmission functional device, connection information of each transmission functional device, and information of the number of wavelengths, which are stored in the facility DB 34. The DB information D2 also includes information of the number of wavelengths as wavelength resources that can be accommodated in the optical fiber 15 in the section A-B.

Figure 3:
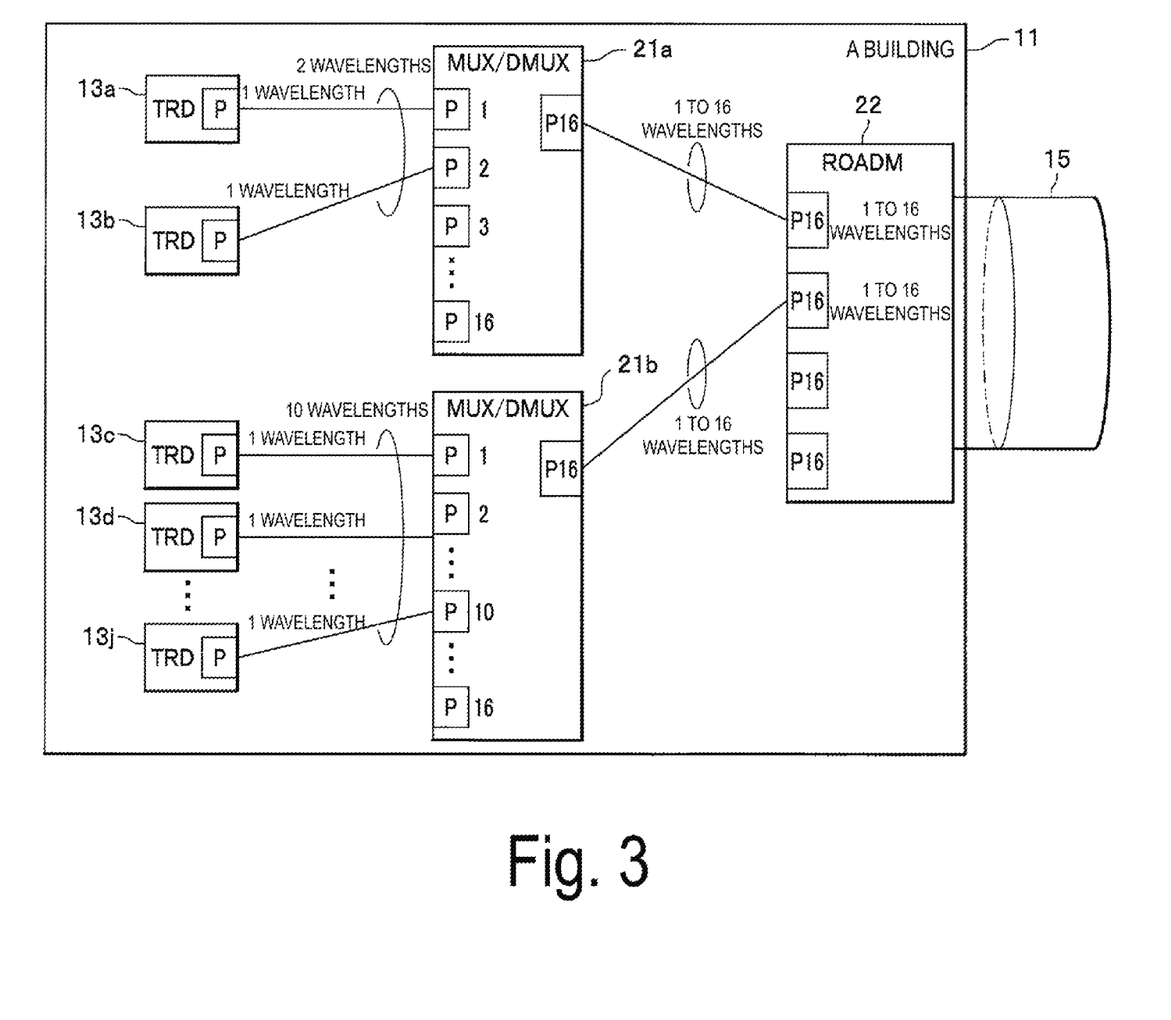
FIG. 3 is a block diagram illustrating a first facility configuration of a site in the transmission system of the disaggregation type according to this embodiment.

For example, in the DB information D2, facility information of the inside of the A building 11 illustrated in FIG. 3 and facility information of the inside of the B building 12 not illustrated in the drawing are aggregated based on order information D1 of a previous time. It is assumed that the facility information of the A building 11 is the same as that of the B building 12, and thus the A building 11 will be representatively described. However, the DB information D2 stores facility information of various transmission functional devices configuring each site in addition to the current DB information D2.

"A" of the A building 11 illustrated in FIG. 3 is a building name. Although floor information is not necessarily required, here, the floor information is assumed to be "10F" indicating a 10-th floor. For example, the unique information of TRDs is "13a", "13b", "13c", "13d", "13f" corresponding to 12 TRDs, the unique information of MUX/DMUXs is "21a" and "21b" corresponding to two MUX/DMUXs, and the unique information of the ROADM is "22" corresponding to one ROADM.

Each of the TRDs 13a to 13j includes one port P that inputs/outputs optical signals. Although not illustrated in the drawings, each of the TRDs 13a to 13j includes a user terminal and a port that inputs/outputs data signals on a side opposite to the port P. The MUX/DMUX 21a and 21b, for example, include 16 ports P on one input/output side that is the TRD side and a port P16 on the other input/output side that is the ROADM side. The 16 ports P16 are configured as one set. The ROADM 22, for example, includes four ports P16, in Which the 16 ports are configured as one set, on the MUX/DMUX side, and the optical fiber 15 is connected to the opposite side of this port P16.

The two TRDs 13a and 13b are connected to two ports P1 and P2 of one MUX/DMUX 21a, and a port P16 of this MUX/DMUX 21a on the opposite side is connected to a port P16 of the ROADM 22. Ten TRDs 13c to 13j are respectively connected to ten first ports P1 to P10 of the other MUX/DMUX 21b, and a port P16 of this MUX/DMUX 21b is connected to a second port P16 of the ROADM 22. Third and fourth ports P16 of the ROADM 22 have no connection. Ports P3 to P16 of the MUX/DMUX 21a also have no connection, and ports P11 (not illustrated in the drawing) to P16 of the MUX/DMUX 21b also have no connection.

In such a facility configuration illustrated in FIG. 3, as wavelength resources of each transmission functional device, the TRDs 13a to 13j have 12 wavelengths, the MUX/DMUXs 21a and 21b have 32 wavelengths, and the ROADM 22 has 32 wavelengths. Thus, 12 wavelengths corresponding to the number of wavelengths of the TRDs 13a to 13j, which is the smallest among them, become wavelength resources (the number of wavelengths) that can be accommodated in the optical fiber 15.

Figure 4:
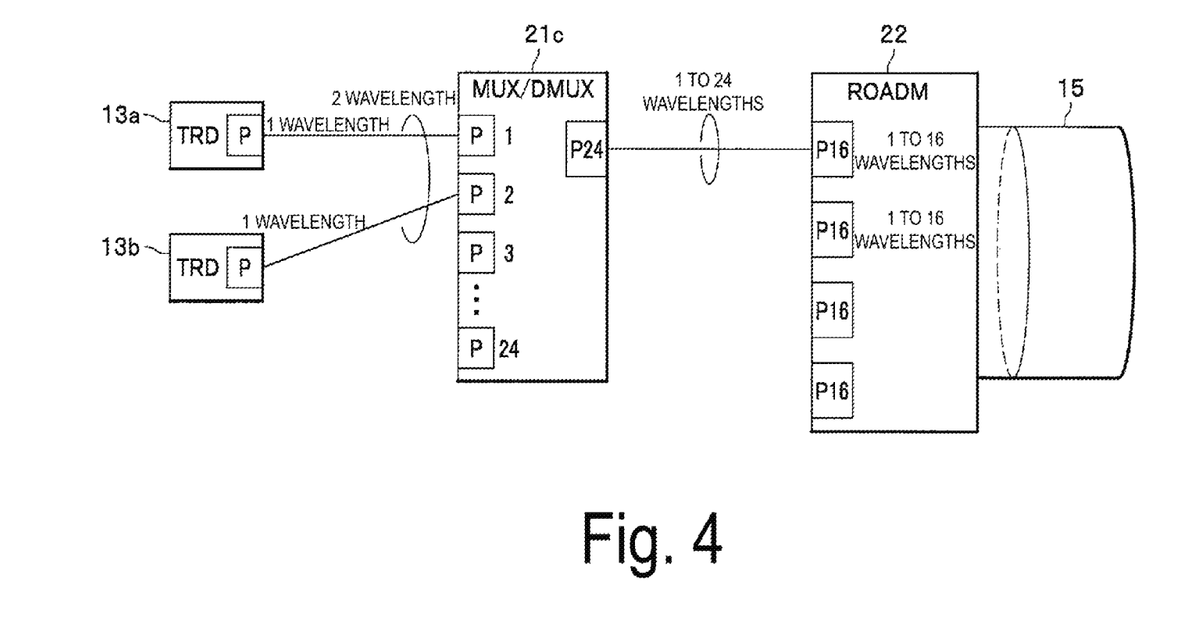
FIG. 4 is a block diagram illustrating a second facility configuration of a site in the transmission system of the disaggregation type according to this embodiment.
Figure 5:
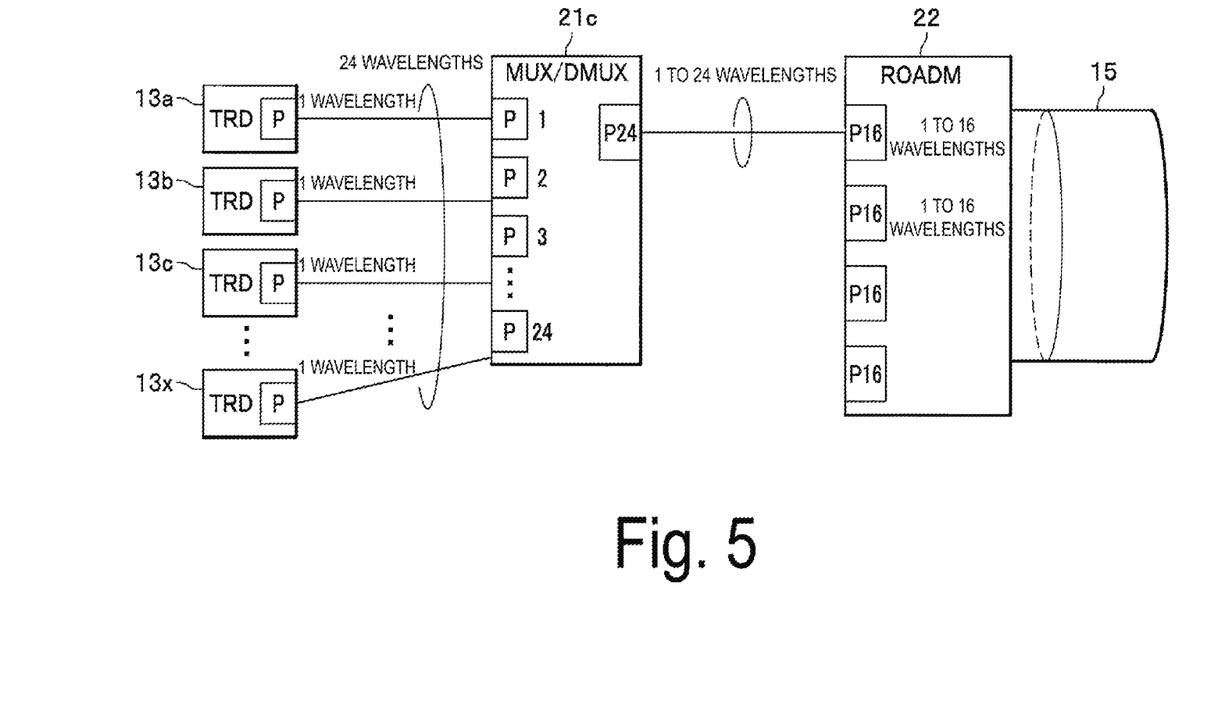
FIG. 5 is a block diagram illustrating a third facility configuration of a site in the transmission system of the disaggregation type according to this embodiment.

Other facility configuration examples thereof are illustrated in FIGS. 4 and 5. In the facility configuration illustrated in FIG. 4, TRDs 13a and 13b have two wavelengths, MUX/DMUXs 21c have 24 wavelengths, and ROADM 22 has 16 wavelengths. Thus, two wavelengths of the TRDs 13a and 13b, which are the smallest among them, become wavelength resources (the number of wavelengths) that can be accommodated in an optical fiber 15.

In the facility configuration illustrated in FIG. 5, TRDs 13a to 13x have 24 wavelengths. MUX/DMUXs 21c have 24 wavelengths, and ROADM 22 has 16 wavelengths. Thus, the 16 wavelengths of the ROADM 22, which are the smallest among them, become wavelength resources (the number of wavelengths) that can be accommodated in an optical fiber 15.

The difference determining unit 32b illustrated in FIG. 2 determines whether there is a difference between the order information D1 and the DB information D2. Here, in a case Where the DB information D2 is the information of the facility configuration illustrated in FIG. 3, the DB information D2 represents that the ROADM 22 has 32 wavelengths, that the MUX/DMUXs 21a and 21b have 32 wavelengths, that the TRDs 13a to 13j have 12 wavelengths, and that the number of wavelengths that can be accommodated in the optical fiber 15 is 12.

Here, it is assumed that the order information D1 is request information for a network configuration indicating that wavelength resources of 12 wavelengths that can be transmitted by 12 TRDs 13a to 13j of the A building 11 illustrated in FIG. 3 and 12 TRDs of the B building 12, which are not illustrated in the drawing, are desired to be used in the section A-B.

In this case, the order information D1 and the DB information D2 have the same number of wavelengths, thus, the difference is zero, and therefore, the difference determining unit 32b determines that there is no difference. Moreover, in a case where the number of wavelengths included in the order information al is smaller than the number of wavelengths of the DB information D2, it is determined that there is no difference.

On the other hand, it is assumed that the order information D1 is request information indicating that wavelength resources of 16 wavelengths that can be transmitted by 16 TRDs are desired to be used in the section A-B. In this case, the difference between the order information D1 (16 wavelengths) and the DB information D2 (12 wavelengths) is four wavelengths, and thus, the difference determining unit 32b determines that the order information D1 has four more wavelengths than the DB information D2, and there is a difference.

When the difference determining unit 32b determines that the order information D1 has four more wavelengths than the DB information D2, and there is a difference, the calculation unit 32c illustrated FIG. 2 calculates the number of wavelengths required for each transmission functional device for obtaining the number of wavelengths (wavelength resources) that can be accommodated in the optical fiber based on the order information D1. In this case, in the optical fiber 15 of the section A-B, the number of wavelengths required for each transmission functional device for obtaining the number of wavelengths, which is 16, that can be transmitted by the 16 TRDs is calculated as below.

The calculation unit 32c, first, acquires the unique information for each transmission functional device and counts the numbers of the respective transmission functional devices. Next, a connection configuration of each transmission functional device is acquired. Next, ports P of each transmission functional device are acquired, and the number of the ports is counted. Next, the number of wavelengths of each transmission functional device is counted.

In other words, to obtain 16 wavelengths that can be accommodated in the optical fiber in the section A-B by using 16 TRDs based on the order information D1, the calculation unit 32c calculates the number of wavelengths required for each transmission functional device. In this case, first, the calculation unit 32c counts the number of each of the TRDs, the MUX/DMUXs, and the ROADM. Here, these devices are transmission functional devices that are required for obtaining 16 wavelengths based on the order information D1. Next, the calculation unit 32c determines the connection configuration of the TRDs, the MUX/DMUXs, and the ROADM the numbers of which have been counted. Next, the calculation unit 32c counts the number of ports of the TRDs, the MUX/DMUXs, and the ROADM used in the connection configuration.

Next, the calculation unit 32c calculates the number of wavelengths that can be accommodated in the TRDs, the MUX/DMUXs, and the ROADM based on the counted number of ports. Thus, 16 wavelengths of the TRDs, 32 wavelengths of the MUX/DMUXs, and 32 wavelengths of the ROADM are calculated. In accordance with 16 wavelengths of the TRDs that are the smallest among the calculated numbers of wavelengths, 16 wavelengths that can be accommodated in the optical fiber 15 of the section A-B are determined.

The determination unit 32d illustrated in FIG. 2 determines, as wavelength resources, the number of wavelengths of each transmission functional device and the number of wavelengths of the optical fiber 15 between sites calculated by the calculation unit 32c. However, in a case where the difference determining unit 32b determines that there is no difference, the determination unit 32d determines the current wavelength resources represented by the DB information D2.

The accommodability determining unit 32e determines whether the number of wavelengths of each transmission functional device and the number of wavelengths of the optical fiber 15 between the sites determined by the determination unit 32d can be accommodated in each transmission functional device of the present state included in the DB information D2 and the optical fiber 15 between the sites.

For example, when it is determined that the number of wavelengths of each transmission functional device determined by the determination unit 32d can be accommodated in each transmission functional device of the present state included in the DB information D2, and it is assumed that the maximum number of wavelengths that can be accommodated in the optical fiber 15 is 16, 12 wavelengths relating to the DB information D2 are in use among the 16 wavelengths, and four wavelengths are not used. Thus, the difference determining unit 32b has already determined that there is a difference of four wavelengths, and therefore, the four wavelengths can be accommodated in a band of the unused four wavelengths in the optical fiber 15.

On the other hand, in a case where each number of wavelengths determined by the determination unit 32d is a number of wavelengths when no difference is determined by the difference determining unit 32b, it is determined that the number of wavelengths can be accommodated.

Furthermore, in a case where each number of wavelengths determined by the determination unit 32d exceeds the number of wavelengths of the present state of the transmission functional device and the number of wavelengths that can be accommodated in the optical fiber 15 between the sites, the accommodability determining unit 32e displays information indicating installation of additional transmission functional devices corresponding to the excess number of wavelengths on a display unit 32h. A system administrator sees this display and installs additional transmission functional devices. In a case where the additional transmission functional devices are installed, the number of wavelengths that can be accommodated in the optical fiber 15 between the sites also increases, and therefore, wavelength resources corresponding to the number of wavelengths determined as above can be achieved.

The update unit 32f updates the DB information D2 in the facility DB 34 with the wavelength resources determined to be accommodable by the accommodability determining unit 32e. For example, the number of wavelengths of the TRDs is updated with 16 wavelengths, the number of wavelengths of the MUX/DMUXs is updated with 32 wavelengths, the number of wavelengths of the ROADM is updated with 32 wavelengths, and the number of wavelengths that can be accommodated in the optical fiber 15 in the section A-B is updated with 16 wavelengths.

When the accommodability determining unit 32e has determined that the number of wavelengths can be accommodated, the configuration instruction unit 32g outputs configuration instruction information D3 giving an instruction for configuring the number of wavelengths of each transmission functional device updated by the update unit 32f to the configuration unit 33 (FIG. 1).

The configuration unit 33 illustrated in FIG. 1 configures the number of wavelengths corresponding to the configuration instruction information D3 in the corresponding transmission functional device such that the number of wavelengths that can be accommodated in the optical fiber 15 between the sites based on the order information D1 is determined.

Operation of Embodiment

Next, operations when wavelength resources (the number of wavelengths) of each transmission functional device inside the A building 11 and the B building 12 and wavelength resources (the number of wavelengths) that can be accommodated in the optical fiber 15 in the section A-B are configured and managed in the transmission system 30 according to this embodiment will be described with reference to a flowchart illustrated in FIGS. 6 and 7.

It is assumed that the DB information D2 that is currently stored in the fact DB 34 includes the unique information of each of transmission functional devices including the TRDs 13a to 13j, the MUX/DMUXs 21a and 21b, and the ROADM 22 illustrated in FIG. 3 in each of the A building 11 and the B building 12, the port information of each of the transmission functional devices, the connection information, information of the number of wavelengths of each of the transmission functional devices, and information acquired by aggregating such information. In other words, it is assumed that information indicating that the TRDs 13a to 13j have 12 wavelengths, that the MUX/DMUXs 21a and 21b have 32 wavelengths, that the ROADM 22 has 32 wavelengths, and that 12 wavelengths can be accommodated in the optical fiber 15 of the section A-B is included.

Figure 6:
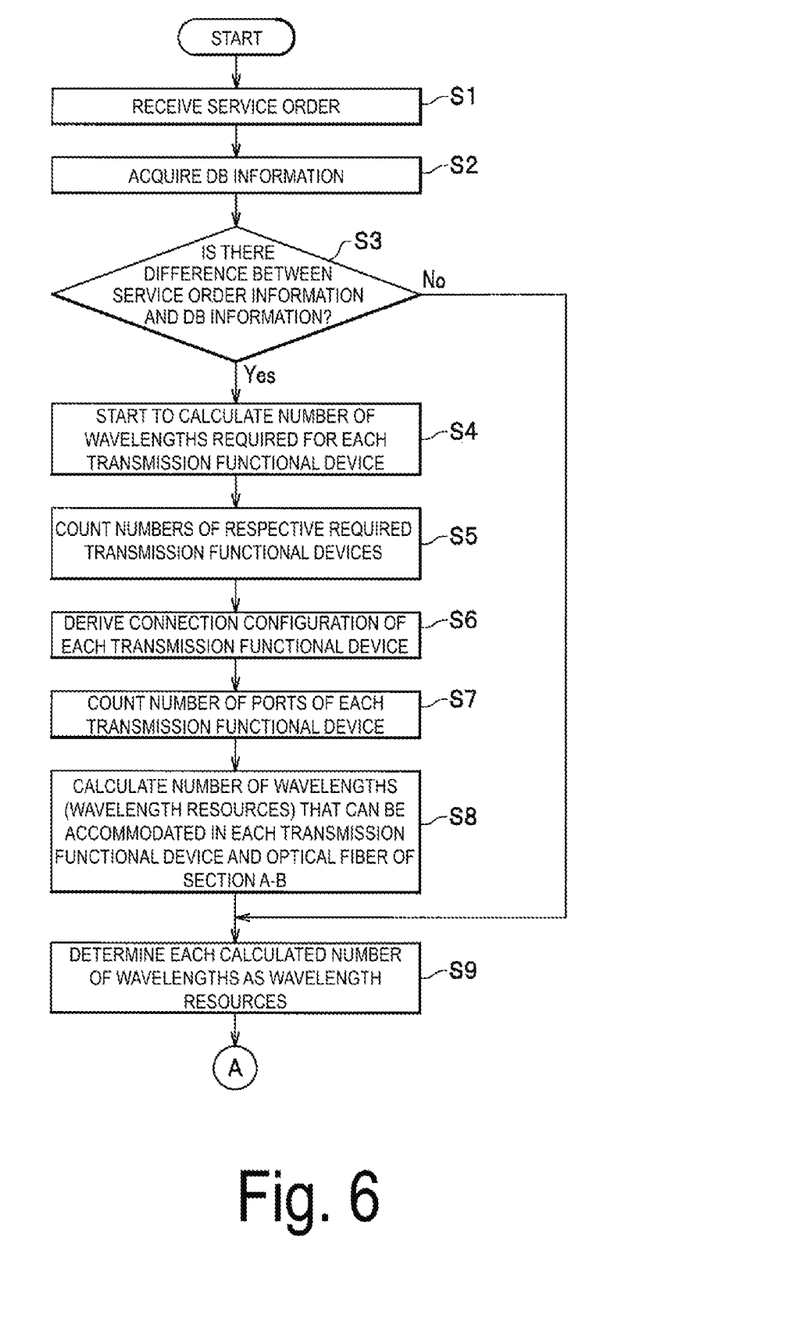
FIG. 6 is a first flowchart illustrating operations when wavelength resources (the number of wavelengths) of each transmission functional device within a site and wavelength resources (the number of wavelengths) that can be accommodated in an optical fiber between sites are configured and managed in the transmission system of the disaggregation type according to this embodiment.

In step S1 illustrated in FIG. 6, it is assumed that the acquisition unit 31 (FIG. 1) has received a service order from a user and has output the received order information D1 to the information acquisition unit 32a of the design unit 32 (FIG. 2). It is assumed that the order information D1 is information indicating that wavelength resources of 16 wavelengths that can be transmitted by 16 TRDs are used in the section A-B.

In step S2, the information acquisition unit 32a acquires DB information D2 from the facility DB 34 and outputs each piece of the information D1 and D2 to the difference determining unit 32b.

Next, in step S3, the difference determining unit 32b determines whether there is a difference between the order information D1 and the DB information D2. In this case, both the order information D1 and the DB information D2 are the information described above, and thus, the number of wavelengths of the TRDs in the order information D1 is four wavelengths more than that of the DB information as a difference. For this reason, the difference determining unit 32b determines that the order information D1 has four more wavelengths, and there is a difference (Yes).

When it is determined that there is the difference, in step S4, the calculation unit 32c starts to calculate the number of wavelengths required for each transmission functional device in order to obtain the number of wavelengths that can be accommodated in the optical fiber 15 in the section A-B based on the order information D1.

In this calculation, first, in step S5, the calculation unit 32c counts the number of each of TRDs, MUX/DMUXs, and ROADMs required for obtaining 16 wavelengths based on the order information D1.

Next, in step S6, the calculation unit 32c determines a connection configuration of the TRDs, the MUX/DMUXs, and the ROADM the numbers of which have been counted as above.

Next, in step S7, the calculation unit 32c counts the number of ports of the TRDs, the MUX/DMUXs, and the ROADM used in the connection configuration.

Next, in step S8, the calculation unit 32c calculates the number of wavelengths required for the TRDs, the MUX/DMUXs, and the ROADM for obtaining the number of wavelengths (wavelength resources) that can be accommodated in the optical fiber 15 in the section A-B based on the number of ports counted in step S7 described above. Thus, 16 wavelengths of the TRDs, 32 wavelengths of the MUX/DMUXs, and 32 wavelengths of the ROADM 32 are calculated, and 16 wavelengths that can be accommodated in the optical fiber 15 in the section A-B are determined.

Thereafter, in step S9, the determination unit 32d determines, as wavelength resources, 16 wavelengths of the TRDs, 32 wavelengths of the MUX/DMUXs, and 32 wavelengths of the ROADM calculated in step S8 described above and 16 wavelengths that can be accommodated in the optical fiber 15 of the section A-B.

Figure 7:
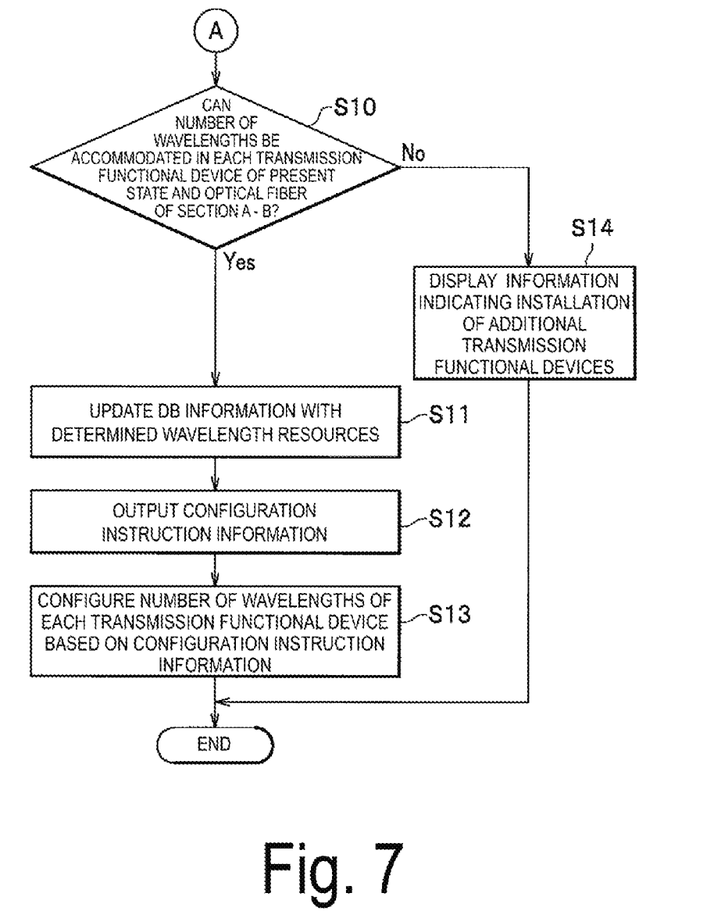
FIG. 7 is a second flowchart illustrating operations when wavelength resources (the number of wavelengths) of each transmission functional device within a site and wavelength resources (the number of wavelengths) that can be accommodated in an optical fiber between sites are configured and managed in the transmission system of the disaggregation type according to this embodiment.

Next, in step S10 illustrated in FIG. 7, the accommodability determining unit 32e determines whether each number of wavelengths of 16 wavelengths that can be accommodated in the optical fiber 15 of the section A-B can be accommodated in each transmission functional device of the present state included in the DB information D2 and the optical fiber 15 of the section A-B. Here, each number of wavelengths of 16 wavelengths is based on the 16 wavelengths of the TRDs, the 32 wavelengths of the MUX/DMUXs, and the 32 wavelengths of the ROADM determined by the determination unit 32d.

As a result, in a case where it is determined that the number of wavelengths can be accommodated (Yes), in step S11, the update unit 32f updates the DB information D2 in the facility DB 34 with the wavelength resources determined in step S10 described above. In other words, the number of wavelengths of the TRDs is updated with 16 wavelengths, the number of wavelengths of the MUX/DMUXs is updated with 32 wavelengths, and the number of wavelengths of the ROADM is updated with 32 wavelengths.

Next, in step S12, the configuration instruction unit 32g outputs configuration instruction information D3 for giving an instruction of each configuration updated in step S11 described above to the configuration unit 33 (FIG. 1).

Next, in step S13, the configuration unit 33 configures the number of wavelengths based on the configuration instruction information D3 in the TRDs, the MUX/DMUXs, and the ROADM such that the number of wavelengths that can be accommodated in the optical fiber 15 between the sites based on the order information D1 is determined. According to this configuration, the number of wavelengths that can be accommodated in the optical fiber 15 between the sites based on the order information D1 is determined.

On the other hand, in a case where the difference determining unit 32b determines that there is no difference (No) as described below in the determination of step S3 described above, the process proceeds to step S9. In other words, the determination of no difference is determined to be accommodable, for example, in a case where the number of wavelengths of the order information D1 is the same as the number of wavelengths corresponding to the DB information D2 described above, in other words, in a case where the difference therebetween is determined to be zero or in a case where the number of wavelengths of the order information D1 is smaller than the number of wavelengths of the DB information D2.

In this case, in step S9, the determination unit 32d determines, as wavelength resources, 12 wavelengths of the TRDs 13a to 13j, 32 wavelengths of the MUX/DMUX 21a and 21b, and 32 wavelengths of the ROADM 22 based on the DB information D2 and 12 wavelengths that can be accommodated in the optical fiber 15 of the section A-B.

In step S10 described above, it is assumed that the accommodability determining unit 32e determines that the number of wavelengths cannot be accommodated (No). This is a case where the number of wavelengths determined by the determination unit 32d in step S9 described above exceeds the number of wavelengths of the transmission functional device of the present state and the number of wavelengths that can be accommodated in the optical fiber 15 between the sites.

In this case, in step S14, the accommodability determining unit 32e displays information indicating installation of additional transmission functional devices corresponding to the excess number of wavelengths on the display unit 32h. A system administrator sees this display and installs additional transmission functional devices. When the additional transmission functional devices are installed, the number of wavelengths that can be accommodated in the optical fiber 15 in the section A-B is increased to satisfy the determination performed by the accommodability determining unit 32e, and therefore, the wavelength resources of the number of wavelengths determined in step S9 described above can be accommodated.

Effects of Embodiment

Effects of the wavelength resource management using the transmission system 30 according to this embodiment will be described.

(1) The transmission system 30 is a system of a disaggregation type formed by connecting sites including various transmission functional devices having specifications of different vendors through the optical fiber 15 and is configured to include the facility DB 34, the design unit 32, and the configuration unit 33.

The facility DB 34 stores, as the DB information D2, facility information including at least the unique information of each transmission functional device, the connection information between transmission functional devices, and the information of the number of wavelengths as wavelength resources that can be accommodated in the optical fiber 15 between the sites and that is determined based on the number of wavelengths of the transmission functional devices.

In a case where the number of wavelengths of the order information that requests the number of wavelengths required when an optical signal is transmitted through the optical fiber 15 between the sites is larger than the number of wavelengths that can be accommodated in the optical fiber 15 that is included in the DB information D2, the design unit 32 designs the number of wavelengths of each transmission functional device that are required for enabling the number of wavelengths of the order information to be accommodated in the optical fiber 15 based on the facility information of each transmission functional device including the DB information D2 in the facility DB 34.

The configuration unit 33 configures the designed numbers of wavelengths in the corresponding transmission functional devices such that the number of wavelengths that can be accommodated in the optical fiber 15 based on the order information D1 is determined.

According to this configuration, the wavelength resources required for transmission of optical signals between the sites through the optical fiber 15 requested in the order information D1 can be automatically configured in the transmission functional devices of each site. For this reason, in the transmission system of the disaggregation type, the wavelength resources that can be accommodated in the optical fiber 15 can be easily grasped and managed.

(2) The design unit 32 is configured to include the accommodability determining unit 32e that determines whether the number of wavelengths for each transmission functional device according to the design described above exceeds the number of wavelengths that can be accommodated in the optical fiber 15 in a case where all the transmission functional devices stored in the facility DB 34 are used and displays in the display unit 32h a necessity to install additional transmission functional devices when the number of wavelengths exceeds the number of wavelengths that can be accommodated.

According to this configuration, when the number of wavelengths of each transmission functional device according to the design exceeds the number of wavelengths that can be accommodated in the transmission functional devices based on the DB information D2, the necessity to install additional transmission functional devices can be displayed in the display unit 32h. For this reason, the system administrator can see the displayed information and install additional transmission functional devices.

In addition, a specific configuration can be changed as appropriate without departing from the spirit of the present invention.

REFERENCE SIGNS LIST

11 A building
12 B building
13, 13a to 13x TRD (transmission functional device)
15 Optical fiber
21, 21a to 21c MUX/DMUX (transmission functional device)
22 ROADM (transmission functional device)
31 Service order acquisition unit
32 Wavelength resource design unit (design unit)
33 Wavelength resource configuration unit (configuration unit)
34 Facility DB (DB)
32a Information acquisition unit
32f Difference determining unit
32c Calculation unit
32d Determination unit
32e Accommodability determining unit
32f Update unit
32g Configuration instruction unit
32h Display unit
D1 Service order information (order information)
D2 DB information
D3 Configuration instruction information

The invention claimed is:

1. A transmission system of a disaggregation type formed by connecting, through an optical fiber, sites each including various transmission functional devices having specifications of different vendors, the transmission system comprising:
a database (DB) configured to store, as DB information, facility information including at least i) unique information of each of the transmission functional devices, ii) connection information between the transmission functional devices, and iii) information of a number of wavelengths as wavelength resources that are capable of being accommodated in the optical fiber between the sites, the wavelength resources being determined based on a number of wavelengths of the transmission functional devices;
a design unit including an accommodability determining unit configured to determine whether a number of wavelengths of each of the transmission functional devices according to the design exceeds the number of wavelengths capable of being accommodated in the optical fiber in a case where all the transmission functional devices stored in the DB are used,
wherein the design unit is configured to design the number of wavelengths of each of the transmission functional devices that is required to enable a number of wavelengths of order information to request the number of wavelengths required when optical signals are transmitted through the optical fiber between the sites to be accommodated in the optical fiber based on the facility information of each of the transmission functional devices stored to include the DB information in the DB in a case where the number of wavelengths of the order information is larger than the number of wavelengths capable of being accommodated in the optical fiber included in the DB information; and
a configuration unit configured to configure the designed number of wavelengths in each of the transmission functional devices.

2. A transmission system of a disaggregation type formed by connecting, through an optical fiber, sites each including various transmission functional devices having specifications of different vendors, the transmission system comprising:
a database (DB) configured to store, as DB information, facility information including at least i) unique information of each of the transmission functional devices, ii) connection information between the transmission functional devices, and iii) information of a number of wavelengths as wavelength resources that are capable of being accommodated in the optical fiber between the sites, the wavelength resources being determined based on a number of wavelengths of the transmission functional devices;
a design unit configured to design the number of wavelengths of each of the transmission functional devices that is required to enable a number of wavelengths of order information to request the number of wavelengths required when optical signals are transmitted through the optical fiber between the sites to be accommodated in the optical fiber based on the facility information of each of the transmission functional devices stored to include the DB information in the DB in a case where the number of wavelengths of the order information is larger than the number of wavelengths capable of being accommodated in the optical fiber included in the DB information; and
a configuration unit configured to configure the designed number of wavelengths in each of the transmission functional devices, wherein the design unit includes an accommodability determining unit configured to determine whether the number of wavelengths of each of the transmission functional devices according to the design exceeds the number of wavelengths capable of being accommodated in the optical fiber in a case where all the transmission functional devices stored in the DB are used, and display a necessity to install additional transmission functional devices in a display unit in a case where the number of wavelengths of each of the transmission functional devices according to the design exceeds the number of wavelengths capable of being accommodated in the optical fiber.

3. A wavelength resource management method using a transmission system of a disaggregation type formed by connecting, through an optical fiber, sites each site including various transmission functional devices having specifications of different vendors, the transmission system comprising a DB configured to store, as DB information, facility information including at least i) unique information of each of the transmission functional devices, ii) connection information between the transmission functional devices, and iii) information of a number of wavelengths as wavelength resources capable of being accommodated in the optical fiber between the sites, the wavelength resources being determined based on a number of wavelengths of the transmission functional devices, a design unit including an accommodability determining unit, and a configuration unit, the wavelength resource management method comprising:

determining, by the accommodability determining unit, whether a number of wavelengths of each of the transmission functional devices according to the design exceeds the number of wavelengths capable of being accommodated in the optical fiber in a case where all the transmission functional devices stored in the DB are used;

designing, by the design unit, the number of wavelengths of each of the transmission functional devices required for enabling a number of wavelengths of order information for requesting the number of wavelengths required when optical signals are transmitted through the optical fiber between the sites to be accommodated in the optical fiber based on the facility information of each of the transmission functional devices stored to include the DB information in the DB in a case where the number of wavelengths of the order information is larger than the number of wavelengths capable of being accommodated in the optical fiber included in the DB information; and configuring, by the configuration unit, the designed number of wavelengths in each of the transmission functional devices.

* * * * *